United States Patent
Li et al.

(10) Patent No.: US 11,237,738 B2
(45) Date of Patent: Feb. 1, 2022

(54) MANAGING OPERATION OF A DATA STORAGE SYSTEM WITH RESERVATION OF METADATA SPACE

(71) Applicant: EMC IP Holding Company LLC, Hopkinton, MA (US)

(72) Inventors: Xiongcheng Li, Beijing (CN); Vamsi K. Vankamamidi, Hopkinton, MA (US); Xinlei Xu, Beijing (CN); Jian Gao, Beijing (CN); Geng Han, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 53 days.

(21) Appl. No.: 16/819,595

(22) Filed: Mar. 16, 2020

(65) Prior Publication Data

US 2021/0286518 A1    Sep. 16, 2021

(51) Int. Cl.
*G06F 3/06* (2006.01)

(52) U.S. Cl.
CPC ............ *G06F 3/062* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | |
|---|---|---|
| 9,069,682 B1 | 6/2015 | Veeraswamy |
| 9,916,102 B1 | 3/2018 | Bassov et al. |
| 10,013,425 B1 | 7/2018 | Bassov |
| 10,146,469 B2 | 12/2018 | Polkovnikov et al. |
| 10,409,776 B1 | 9/2019 | Bassov |
| 10,740,019 B1 | 8/2020 | Venkat et al. |
| 11,093,317 B1 | 8/2021 | Vankamamidi et al. |
| 2002/0019908 A1* | 2/2002 | Reuter .................. G06F 3/0605 711/112 |
| 2007/0260837 A1* | 11/2007 | Hsu ...................... G06F 12/1441 711/163 |
| 2010/0042802 A1* | 2/2010 | Helman ................ G06F 3/0605 711/173 |
| 2017/0212690 A1* | 7/2017 | Babu ..................... G06F 3/0608 |
| 2017/0316027 A1* | 11/2017 | Mondal ................. G06F 16/182 |
| 2021/0132829 A1 | 5/2021 | Zhao et al. |

* cited by examiner

*Primary Examiner* — Yaima Rigol
(74) *Attorney, Agent, or Firm* — BainwoodHuang

(57) ABSTRACT

A method of managing operation of a data storage system (DSS) is provided. The method includes (a) reserving space within a dedicated metadata storage region (DMSR); (b) in response to determining that accommodating a storage request requires use of the reserved space, entering a restricted write mode; (c) while operating in the restricted write mode, using the reserved space in a process that frees space within the DMSR outside the reserved space; and (d) exiting the restricted mode in response to freeing space within the DMSR outside the reserved space. An apparatus, system, and computer program product for performing a similar method are also provided.

20 Claims, 4 Drawing Sheets

MANAGING OPERATION OF A DATA STORAGE SYSTEM WITH RESERVATION OF METADATA SPACE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Many storage systems provide data objects, such as logical disks, to the hosts, drawn from their non-volatile storage devices. In some such systems, logical disks are created and organized on an as-needed basis. Metadata may be used to organize the logical disks within such systems.

SUMMARY

Some modern storage systems use large amounts of metadata (e.g., 10% or more of their user data usage) to organize their logical disks. Persistently storing this metadata is important because without it, it can be difficult or even impossible to locate user data. In some systems, it may not even be possible to identify to which logical disk user data belongs without its associated metadata. Thus, it is important that as user data is written to storage, the associated metadata also be persistently stored. Some storage systems use a dedicated metadata storage area in which to store the metadata. This dedicated metadata storage area can be expanded as needed. However, when system usage is high, it can happen that no additional storage may be available at any given moment. If this happens just as the dedicated metadata storage area reaches its capacity, then the system may not have the ability to accept any additional writes, since there is no more space in which to store metadata.

In some systems, write requests may be cached prior to being written to permanent or long-term storage. Once cached, writes are typically confirmed back to the hosts as being completed. Thus, it is important that they be able to be completed with respect to permanent or long-term storage. However, if the dedicated metadata storage area reaches its capacity while the cache still contains cached writes, then it may not be possible to move them into permanent or long-term storage.

In addition, in some systems, when metadata is erased from the dedicated metadata storage area, freed metadata locations are listed in a free list. Since the free list is also stored within metadata, it may not be possible to free metadata if the dedicated metadata storage area is completely full. Therefore, even if an entire logical disk is erased, the amount of space available for metadata to be stored in the dedicated metadata storage area may not be able to increase, as long as new storage is not available to be allocated thereto.

Thus, it would be desirable to overcome some or all of these various shortcomings associated with the dedicated metadata storage area becoming full. This can be accomplished by reserving a portion of the dedicated metadata storage area for system use and refusing any new write requests from hosts if the reserved portion would be encroached upon. For example, when the non-reserved portion of the dedicated metadata storage area becomes full, a storage system may enter a restricted write state. In the restricted write state, certain system operations that require additional metadata may use the reserved portion. For example, logical disks can be deleted so that metadata can be deleted, even though the free list may then encroach upon the reserved portion. As another example, cached write operations may be completed, even though doing so may include writing new metadata into the reserved portion.

In one embodiment, a method of managing operation of a data storage system (DSS) is provided. The method includes (a) reserving space within a dedicated metadata storage region (DMSR); (b) in response to determining that accommodating a storage request requires use of the reserved space, entering a restricted write mode; (c) while operating in the restricted write mode, using the reserved space in a process that frees space within the DMSR outside the reserved space; and (d) exiting the restricted mode in response to freeing space within the DMSR outside the reserved space. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for overcoming various shortcomings associated with a dedicated metadata storage area becoming full. This result may be accomplished by reserving a portion of the dedicated metadata storage area for system use and refusing any new write requests from hosts if the reserved portion would be encroached upon. For example, when the non-reserved portion of the dedicated metadata storage area becomes full, a storage system may enter a restricted write state. In the restricted write state, certain system operations that require additional metadata may use the reserved portion. For example, logical disks can be deleted so that metadata can be deleted, even though the free list may then encroach upon the reserved portion. As another example, cached write operations may be completed, even though doing so may include writing new metadata into the reserved portion.

Figure 1:
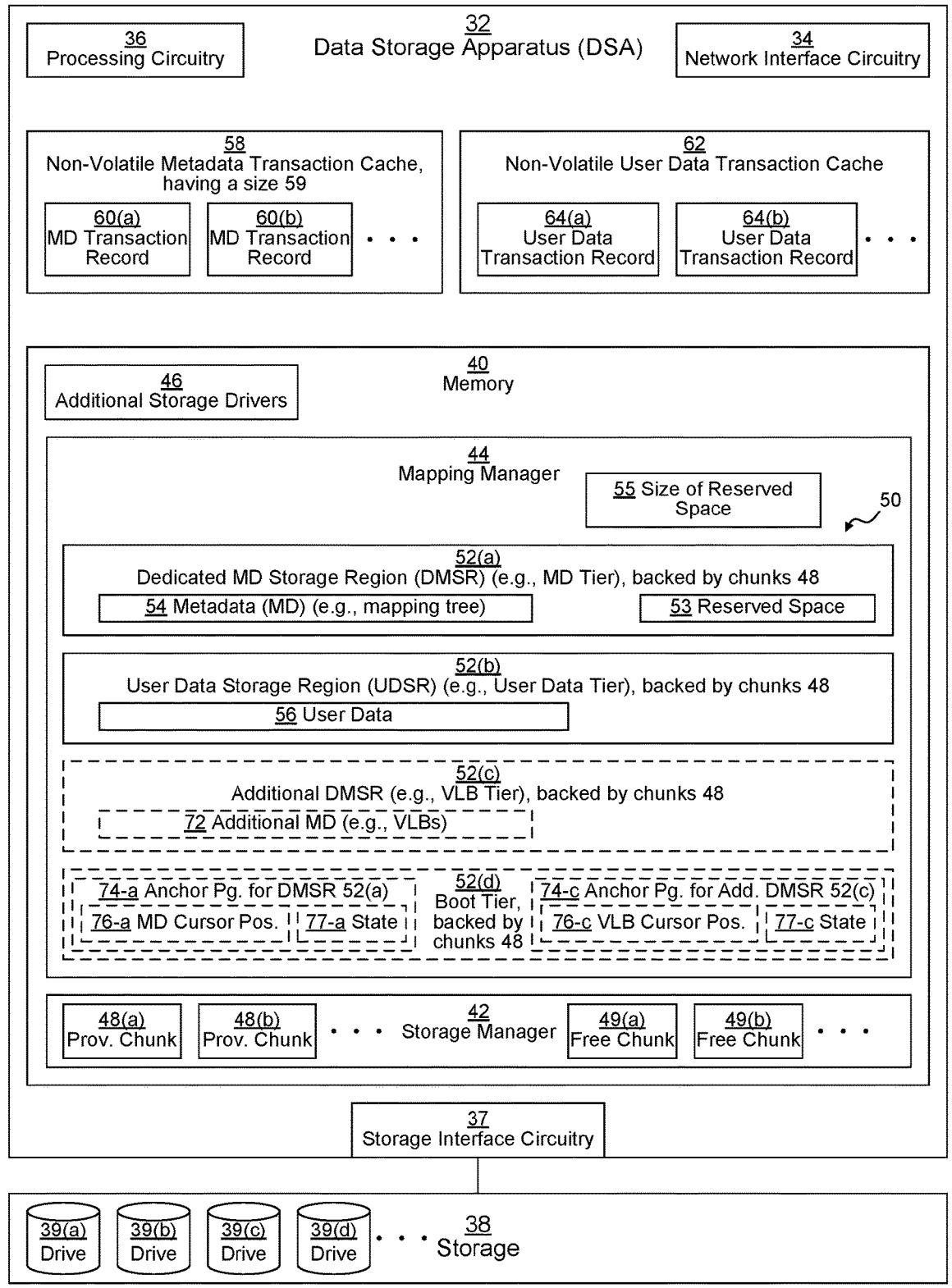
FIG. 1 is a block diagram depicting an example system, apparatus, and data structure arrangement for use in connection with various embodiments.

FIG. 1 depicts an example data storage environment (DSE) 30. DSE 30 may include one or more data storage apparatus (DSA) 32. Each DSA 32 may be any kind of computing device or collection (or cluster) of computing devices, such as, for example, a personal computer, workstation, server computer, enterprise server, data storage array device, laptop computer, tablet computer, smart phone, mobile computer, etc.

DSA 32 at least includes processing circuitry 36, storage interface circuitry 37, and memory 40. In some embodiments, a DSA 32 may also include network interface circuitry 34 and non-volatile caches 58, 62, as well as various other kinds of interfaces (not depicted). DSA 32 also includes interconnection circuitry (not depicted).

Processing circuitry 36 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to persistent storage 38 for long-term storage. Storage interface circuitry 37 may include, for example, SCSI, SAS, ATA, SATA, FC, M.2, U.2, and/or other similar controllers and ports. Persistent storage 38 includes a plurality of non-transitory persistent storage devices 39 (depicted as drives 39(a), 39(b), 39(c), 39(d), . . . ), such as, for example, hard disk drives, solid-state storage devices (SSDs), flash drives, etc. In some embodiments, storage 38 may be located within the DSA 32 itself, while in other embodiments, some or all of the storage 38 may be located external to the DSA 32. In some embodiments, two or more DSAs 32 may share the same storage 38. In some embodiments, two or more DSAs 32 may be housed in a single enclosure together with the storage 38. In some of these embodiments, an interprocessor bus (not depicted) may provide a high-speed connection between the DSAs 32 within the same enclosure, e.g., allowing for cache mirroring.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows the DSA 32 to communicate with one or more host devices (not depicted) over the network.

Memory 40 may be any kind of digital system memory, such as, for example, random access memory (RAM). Memory 40 stores an operating system (OS, not depicted) in operation (e.g., a Linux, UNIX, Windows, MacOS, or similar operating system). Memory 40 also stores a storage manager 42, mapping manager 44, various additional storage drivers 46, and other software modules (not depicted) which each execute on processing circuitry 36. In some embodiments, storage manager 42, mapping manager 44, and some of the various additional storage drivers 46 constitute layers of a multi-layered storage stack (not depicted).

Storage manager 42 aggregates and divides storage 38 into a plurality of chunks 48, 49 of storage, including provisioned chunks 48 (which have already been provisioned for use) and free chunks 49 (which are still available to be provisioned). In some embodiments, storage manager 42 may organize the drives 39 into one or more redundancy groups (not depicted). A redundancy group is a logical grouping of drives 39 from which stripes are drawn and provided to the mapping manager 44 as provisioned chunks 48. Each drive 39 is logically divided into a set of extents (not depicted). Typically, each extent is a logically-contiguous set of storage locations within the drive 39. Each extent is typically the same size within any given redundancy group. In some embodiments, each extent is 4 gigabytes, although this is by way of example only; in other embodiments, an extent may be larger or smaller. For example, an extent may be as small as one sector (e.g., 512 bytes) or one block (e.g., 4 or 8 kilobytes). Different drives 39 may have different numbers of extents therein. Groups of extents from different drives 39 are combined to form chunks 48, 49, as is known in the art, using RAID or Mapped RAID techniques, for example. An example Mapped Raid arrangement is described in U.S. patent application Ser. No. 16/773,774 (filed Jan. 27, 2020), incorporated herein by this reference. In some embodiments, each chunk 48, 49 is the same size, such as, for example, forty-eight gigabytes (GB), although this is by way of example only; in other embodiments, a chunk 48, 49 may be larger or smaller.

Mapping manager 44 maintains a logical mapping of a namespace (not depicted) into provisioned chunks 48. The namespace allows various logical disks (and other data objects) to be assigned different address ranges, with particular addresses in the namespace assigned to particular portions of the provisioned chunks 48. An example configuration of a namespace is described in U.S. patent application Ser. No. 16/773,774.

Mapping manager 44 also manages a set 50 of dedicated storage areas, such as tiers 52, which are each backed by a separate set of provisioned chunks 48. The set 50 includes at least a dedicated metadata (MD) storage region (DMSR) 52(a) (e.g., a metadata tier) and a user data storage region (UDSR) 52(b) (e.g., a user data tier). In some embodiments, set 50 also includes an additional DMSR 52(c) for storing a different type of metadata and a boot tier 52(d) for storing various system information. In some embodiments, set 50 also includes a dedicated metadata consistency checking region (not depicted).

UDSR 52(b) stores user data 56. In some embodiments, the user data 56 is stored in a journaling form, with all new blocks of data (not depicted) written sequentially, with user data 56 from multiple logical disks comingled. Blocks are not overwritten, but rather replaced with new blocks and invalidated. Eventually, provisioned chunks 48 of UDSR 52(b) that contain large amounts of invalidated blocks undergo garbage collection and are returned back to the storage manager 42 as free chunks 49.

DMSR 52(a) stores metadata 54 that organizes the user data 56. For example, metadata 54 may include one or more trees of metadata nodes (not depicted), such as, for example, as described in U.S. patent application Ser. No. 16/773,774. It should be noted that in systems in which snapshots of logical disks are taken periodically (with snapshots sharing most underlying blocks of data unless there is a write split), although some metadata nodes may be shared between snapshots and the main logical disk, many of the metadata nodes are not shared, which leads to a large increase in the amount of metadata 54 due to the use of snapshotting. DMSR 52(a) also includes a reserved space 53, which represents a portion of the total storage capacity allocated to DMSR 52(a). Reserved space 53 has a size 55. The size 55 may be fixed or it may be dynamic, based on various factors. In one example embodiment, the size 55 is 200 megabytes (MB). Mapping manager 44 is configured to treat the reserved space 53 as unavailable for metadata 54 under ordinary circumstances. If the amount of metadata 54 within DMSR 52(a) reaches the full allocated capacity of the DMSR 52(a) minus the reserved space 53, then mapping manager 44 may be configured to enter a restricted write mode, during which (most) new write requests from hosts and users are denied.

In some embodiments, Additional DMSR 52(c) stores additional metadata 72 also used to organize the user data 56. For example, additional metadata 72 may include virtual logical blocks (VLBs), which are data structures that point to blocks of user data 56 and keep track of reference counts. Thus, VLBs enable deduplication by allowing multiple logical disks (or even multiple logical addresses within a single logical disk) to share the same underlying block of user data 56. In some embodiments, the VLBs may be stored in DMSR 52(a) rather than in Additional DMSR 52(c). In some embodiments (not depicted), Additional DMSR 52(c) may also have a reserved space 53 similar to DMSR 52(a). In some embodiments, the reserved space 53 of Additional DMSR 52(c) may be the same size as the reserved space 53 similar to DMSR 52(a), while in other embodiments, the reserved space 53 of Additional DMSR 52(c) may have a different size than the reserved space 53 of DMSR 52(a).

In some embodiments, boot tier 52(d) is used to store information about the other tiers 52. Thus, boot tier 52(d) may store an anchor page 74 for one or more of the other tiers 52. For example, as depicted, anchor page 74-a represents DMSR 52(a), and it includes a metadata cursor position 76-a that indicates a position within DMSR 52(a) where new metadata 54 is to be written (although, in some embodiments, new metadata 54 is preferentially written to an empty location prior to the MD cursor position 76-a if available—see below in connection with FIG. 4). The MD cursor position 76-a can be used to calculate how much remaining space there is within the DMSR 52(a). In some embodiments, anchor page 74-a also stores a state 77-a of the DSA 32. For example, state 77-a may indicate whether or not the DSA 32 is in the restricted write mode. State 77-a may be, for example, a binary flag.

In addition, as depicted, anchor page 74-c represents Additional DMSR 52(c), and it includes a VLB cursor position 76-c that indicates a position within Additional DMSR 52(c) where new additional metadata 72 (e.g., VLBs) is to be written (although, in some embodiments, new additional metadata 72 is preferentially written to an empty location prior to the cursor position 76-c if available—see below in connection with FIG. 4). The VLB cursor position 76-c can also be used to calculate how much remaining space there is within the Additional DMSR 52(c). In some embodiments, anchor page 74-c also stores a state 77-c of the DSA 32. In some embodiments, state 77-c may be the same as state 77-a, while in other embodiments, states 77-a and 77-c may be different. For example, state 77-a may represent whether the DSA 32 has entered the restricted write mode due to impingement into the reserved space 53 of DMSR 52(a), while state 77-c may represent whether the DSA 32 has entered the restricted write mode due to impingement into the reserved space 53 of Additional DMSR 52(c).

In some embodiments, if DSA 32 goes offline and restarts or reboots, upon starting up, mapping manager 44 reads the anchor page(s) 74 from the boot tier 52(d). Mapping manager 44 is then able to determine whether to restart in the restricted write mode by reading state 77-a and/or state 77-c. In embodiments in which several DSAa 32 share access to the same storage 38, whether one or all DSAs 32 go down, each DSA 32 that restarts is able to correctly decide whether to enter the restricted write mode by reading the state 77-a and/or state 77-c from shared boot tier 52(d).

Memory 40 may also store various other data structures used by the OS, storage manager 42, mapping manager 44, various additional storage drivers 46, and various other applications. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the DSA 32 is powered off. The OS, applications, storage manager 42, mapping manager 44, and various additional storage drivers 46 are typically stored in this persistent storage portion of memory 40 or on persistent storage 38 so that they may be loaded into a system portion of memory 40 upon a system restart or as needed. The storage manager 42, mapping manager 44, and various additional storage drivers 46, when stored in non-transitory form either in the volatile portion of memory 40 or on persistent storage 38 or in persistent portion of memory 40, each form a computer program product. The processing circuitry 36 running one or more applications thus forms a specialized circuit constructed and arranged to carry out the various processes described herein.

In some embodiments, DSA 32 may also include a non-volatile (NV) metadata transaction cache 58 and an NV user data transaction cache 62. Each NV cache 58, 62 is made up of high-speed NV memory (e.g., high-speed SSDs, battery-backed memory, or other high-speed persistent memory). NV MD transaction cache 58 is configured to store MD transaction records 60 (depicted as MD transaction records 60(a), 60(b), . . . ). Similarly, NV user data transaction cache 62 is configured to store user data transaction records 64 (depicted as MD transaction records 64(a), 64(b), . . . ). Each MD transaction record 60 may include information about metadata that is associated with user data stored in a corresponding user data transaction record 64 that has been received from a host or a user as part of a confirmed write request (not depicted). Eventually, the metadata of each MD transaction record 60 will be written to DMSR 52(a) as metadata 54, while the corresponding user data of each user data transaction record 64 will be written to UDSR 52(b) as user data 56. In some embodiments, even if DSA 32 has entered a restricted write mode, the metadata of a MD transaction record 60 may be written to the reserved space 53 of DMSR 52(a) as metadata 54 (while the corresponding user data a user data transaction record 64 is also written to UDSR 52(b) as user data 56).

In some embodiments, the size 55 of the reserved space 55 is set to be equal to at least the size of the NV MD transaction cache 58 (e.g., 200 MB). In other embodiments, size 55 may be larger or smaller.

Figure 2:
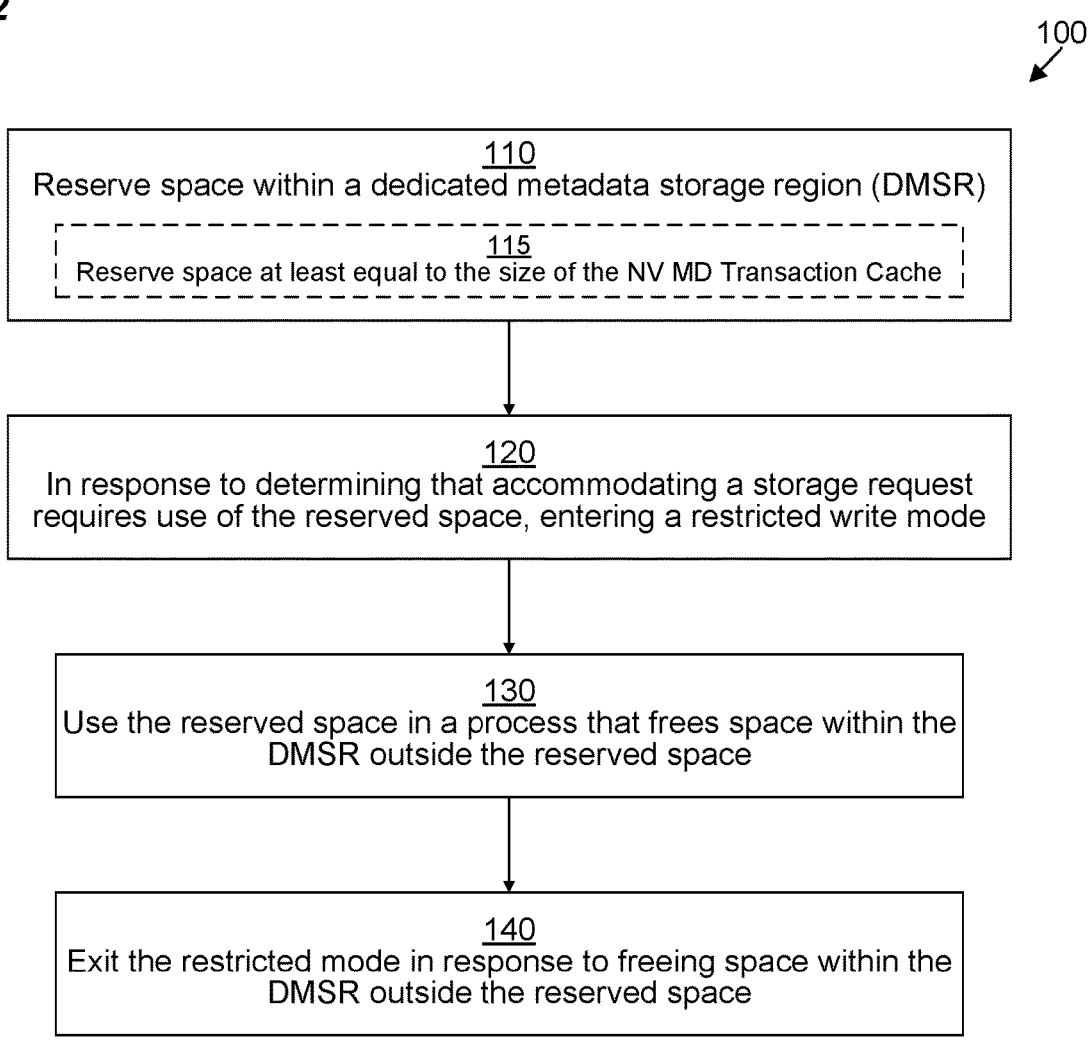
FIG. 2 is a flowchart depicting example methods of various embodiments.

FIG. 2 illustrates an example method 100 performed by DSA 32 for managing operation of the DSA 32 with reservation of space 32 within a DMSR 52(a). It should be understood that any time a piece of software (e.g., storage manager 42, mapping manager 44, various additional storage drivers 46) is described as performing a method, process, step, or function, what is meant is that a computing device (e.g., DSA 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that sub-steps are either optional or representative of alternate embodiments or use cases.

In step 110, mapping manager 44 reserves space within DMSR 52(a). In some embodiments, mapping manager 44 sets aside the reserved space 53 having a size 55 equal at least to the size of the NV MD transaction cache 58. See below in connection with FIG. 4 for more detail.

In step 120, in response to determining that accommodating a new storage request (e.g., a write, create, or delete request) requires use of the reserved space 53, mapping manager 44 causes the DSA 32 to enter a restricted write mode.

In step 130, while operating in the restricted write mode, mapping manager 44 uses the reserved space 53 in a process that frees space within the DMSR 52(a) outside the reserved space 53.

In step 140, mapping manager 44 causes the DSA 32 to exit the restricted write mode in response to freeing space within the DMSR 52(a) outside of the reserved space 53.

Figure 3:
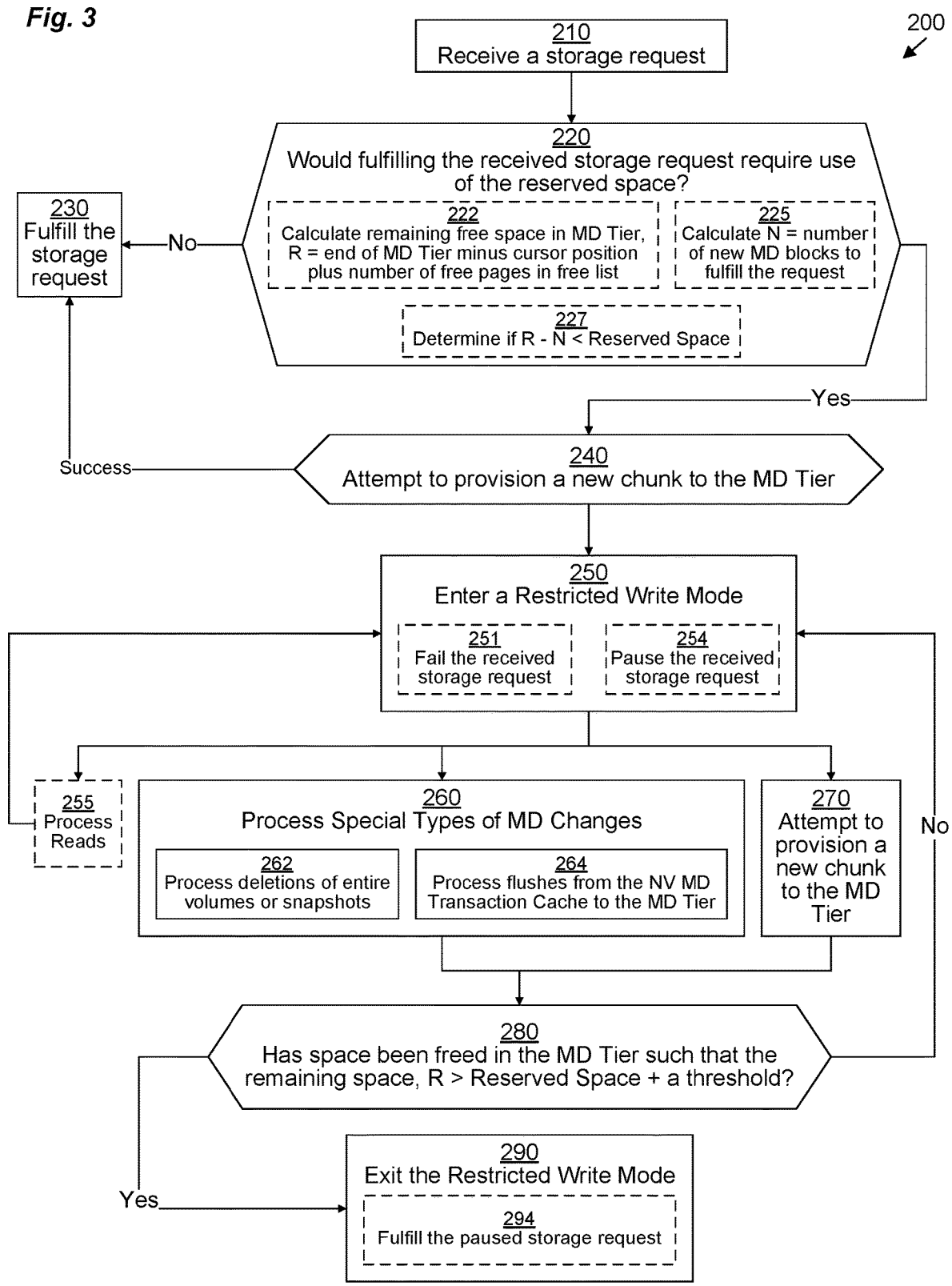
FIG. 3 is a flowchart depicting example methods of various embodiments.

FIG. 3 illustrates an example method 200 performed by DSA 32 for responding to storage requests and entering, exiting, and operating in restricted write mode. It should be understood that method 200 overlaps to an extent with method 100. It should further be understood that one or more of the steps or sub-steps of method 200 may be omitted in some embodiments. Similarly, in some embodiments, one or more steps or sub-steps may be combined together or performed in a different order. Dashed lines indicate that sub-steps are either optional or representative of alternate embodiments or use cases.

In step 210, DSA 32 receives a storage request (e.g., a write request) from a host (or the storage request may instead be received internally from a process running on DSA 32). Then, in step 220, mapping manager 44 determines whether or not fulfilling the received storage request would require use of the reserved space 53 within DMSR 52(a). In some embodiments, step 220 may include one or more of sub-steps 222, 225, 227. For example, if the storage request is a read request, then in most cases there would be no need to use the reserved space 53, since no new metadata 54 would need to be written. Similarly, if the storage request is an overwrite-in-place request, it is possible that no new metadata would need to be created, especially if snapshotting is disabled.

In sub-step 222, mapping manager 44 calculates a value, R, of the remaining amount of unused space within DMSR 52(a). In some embodiments, this calculation may include subtracting a metadata cursor position 76-a from an allocated size of the DMSR 52(a) and adding an amount of empty space within the DMSR 52(a) below the metadata cursor position 76-a by reading pointers from a list of freed blocks of metadata. Reference is now made to FIG. 4.

Figure 4:
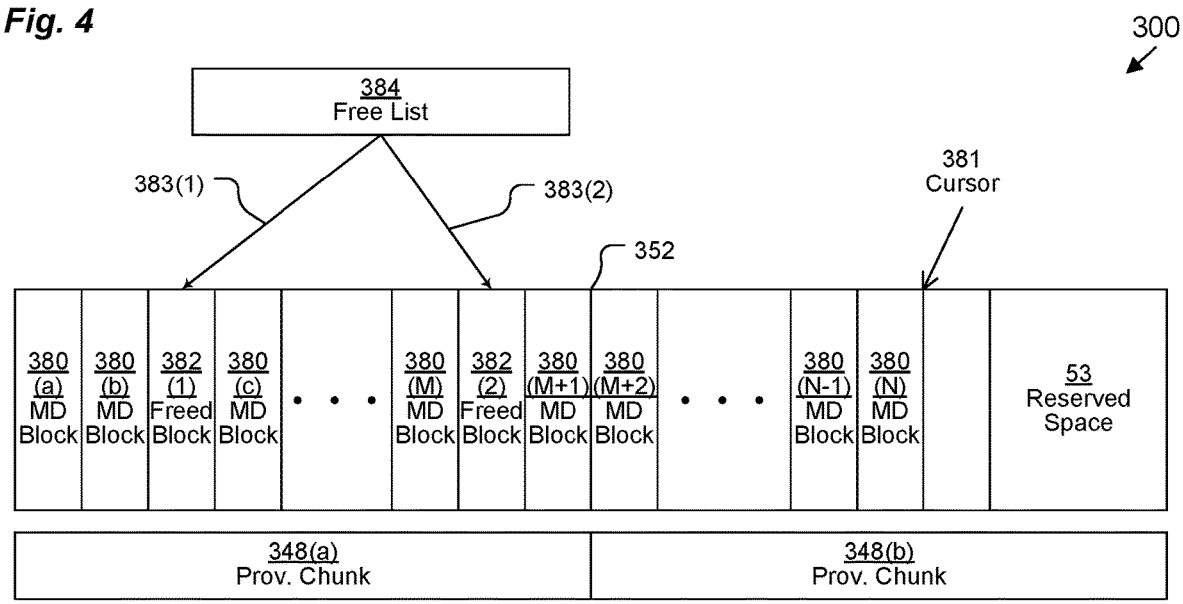
FIG. 4 is a block diagram depicting an example data structure arrangement for use in connection with various embodiments.

FIG. 4 depicts an example arrangement 300 of a metadata tier 352 that implements DMSR 52(a). It should be understood that a similar arrangement may also be used for Additional DMSR 52(d). Metadata tier 352 is backed by a plurality of provisioned chunks 48, depicted as two chunks 348(a), 348(b). Metadata blocks 380 (depicted as MD Blocks 380(a), 380(b), 380(c), . . . 380(M), 380(M+1), 380(M+2), . . . 380(N−1), 380(N)) are written sequentially to the metadata tier 352. A metadata block 380 may be, for example, 4 kilobytes in size, for example. A metadata block 380 may contain, for example, one or more nodes of a metadata tree (not depicted). If a node of metadata 54 needs to be updated, the metadata block 380 that it is stored in may be updated in place. However, if an entire metadata block 380 is able to be deleted, then it is converted into a freed block 382, and a pointer 383 to that freed block 382 is added to a free list 384. Thus, as depicted, a metadata block 380 between metadata blocks 380(b) and 380(c) has been deleted, forming freed block 382(1), and a metadata block 380 between metadata blocks 380(M) and 380(M+1) has been deleted, forming freed block 382(2). Pointers 383(1), 3838(2) to freed blocks 382(1), 382(2) are included within free list 384. Free list 384 may be arranged as a linked list or an array spread out across a set of one or more metadata blocks 380. Whenever a new metadata block 380 needs to be written, if there are any pointers 383 to freed blocks 382 within the free list 384, then the new metadata block 380 is written to one of the freed blocks 382 and its pointer 383 is removed from the free list 384. If there are no pointers 383 to any freed blocks 382 remaining within the free list 384, then the new metadata block 380 is written at the metadata cursor position 76-a, which represents the lowest address within the metadata tier 352 to which a metadata block 380 has not yet been written. This is indicated by the cursor 381. Reserved space 53 is located at the end of metadata tier 352. Prior to entering the restricted write mode, the reserved space 53 is located entirely past the cursor 381.

Returning to FIG. 3, the cursor 381 indicates the maximum extent of metadata blocks 380 written to DMSR 52(a), so the size of the DMSR 52(a) (e.g., the size of two chunks 48, as depicted, such as, for example 96 GB) minus the address of the cursor 381 (e.g., the MD cursor position 76-a multiplied by the block size of, for example, 4 KB) represents the amount of unused space within DMSR 52(a) past the cursor 381. The number of pointers 383 within the free list 384 multiplied by the block size represents the amount of empty space within the DMSR 52(a) below the metadata cursor position 76-a. By summing the amount of unused space within DMSR 52(a) past the cursor 381 and the amount of empty space within the DMSR 52(a) below the metadata cursor position 76-a, the remaining amount, R, of space within DMSR 52(a) can be calculated. It should be understood that the MD cursor position 76-a can be obtained by reading from the anchor page 74-a in the boot tier 52(d).

In sub-step 225, mapping manager 44 calculates the amount, N, of new metadata needed to be written to DMSR 52(a) in order to accommodate the storage request. For example, if four new metadata blocks need to be written, and the metadata block size is 4 KB, then N=12 KB.

Then, in stub-step 227, mapping manager 44 determines whether R−N<the size 55 of the reserved space 53. If not, then fulfilling the write request would not impinge on the reserved space 53, so operation proceeds with step 230, in which the write requests is fulfilled normally. Otherwise, operation proceeds with step 240.

In step 240, mapping manager 44 attempts to provision additional space for DMSR 52(a). This may include sending a request to storage manager 42 requesting a provisioned chunk 48 to add to the end of metadata tier 352. If this request succeeds, then DMSR 52(a) expands in size, so operation continues with step 230, in which the write request is fulfilled normally. Otherwise, operation proceeds with step 250.

In step 250, mapping manager 44 causes DSA 32 to enter the restricted write mode. This may include updating the value of the flag(s) 77 in the boot tier 52(d). In some embodiments, step 250 includes sub-step 251, in which mapping manager 44 reports failure of the write request that was received in step 210. In other embodiments, step 250 includes sub-step 254, in which mapping manager 44 pauses the write request that was received in step 210 until such time as it can be completed successfully.

Once DSA 32 has entered the restricted write mode, operation may proceed with step 260 or 270. In some embodiments, step 255 may also be performed.

In some embodiments, read operations are permitted in the restricted write mode. In these embodiments, step 255 may follow step 250, in which host read operations are processed as normal. Operation then returns to step 250, remaining in the restricted write mode.

In step 260, mapping manager 44 processes certain types of metadata updates, depending on the embodiment. In sub-step 262, deletions of entire logical disks or volumes are processed. In some embodiments, deletions of entire snapshots of logical disks may also be processed. These operations allow some blocks 380 of metadata 54 to be freed and added to the free list 384. It should be understood that when additional pointers 383 are thereby added to the free list 384, the free list 384 itself may expand, which may entail storing part of the free list 384 within the reserved space 53. In sub-step 264, mapping manager 44 processes flushes from the NV MD transaction cache 58 to the DMSR 52(a).

In some embodiments (not depicted), certain types of write operations may also be processed if they are guaranteed not to result in any new metadata blocks 380 being created. For example, an overwrite of existing user data may be permitted in a logical disk that has snapshotting disabled.

In step 270, mapping manager 44 attempts to provision additional space for DMSR 52(a). This may include sending a request to storage manager 42 requesting a provisioned chunk 48 to add to the end of metadata tier 352. If this request succeeds, then DMSR 52(a) expands in size.

After steps 260, 270 operation continues with step 280. In step 280, mapping manager determines whether or not sufficient space has been freed within DMSR 52(a) such that the remaining space satisfies R>the size 55 of the reserved space 53 plus a threshold. The threshold may be employed to prevent constantly going in and out of the restricted write mode. Thus, the threshold may be, for example, 1.5 MB. If enough space has not been determined to have been freed in step 280, then operation returns back to step 250, remaining in the restricted write mode. Otherwise, operation continues with step 290, in which mapping manager 44 causes DSA 32 to exit the restricted write mode. In embodiments in which the write request of step 110 was paused (see sub-step 254 above), step 290 may include sub-step 294 in which that write request is unpaused. Step 290 may also include updating the value of the flag(s) 77 in the boot tier 52(d).

Thus, techniques have been presented for overcoming various shortcomings associated with a DMSR 52(a) becoming full. This result may be accomplished by reserving a portion 53 of the DMSR 52(a) for system use and refusing any new write requests from hosts if the reserved portion 53 would be encroached upon. For example, when the non-reserved portion of the DMSR 52(a) becomes full, a storage system 32 may enter a restricted write state. In the restricted write state, certain system operations that require additional metadata 54 may use the reserved portion 53. For example, logical disks can be deleted so that metadata 54 can be deleted, even though the free list 384 may then encroach upon the reserved portion 53. As another example, cached write operations (see, e.g., MD transaction records 60) may be completed, even though doing so may include writing new metadata 54 into the reserved portion 53.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

The invention claimed is:

1. A method of managing operation of a data storage system (DSS), the method comprising:
reserving space within a dedicated metadata storage region (DMSR);
in response to determining that accommodating a storage request requires use of the reserved space, entering a restricted write mode, wherein determining that accommodating the storage request requires use of the reserved space includes:
calculating a remaining amount, R, of space in the DMSR;

determining an amount, N, of new metadata needed to accommodate the storage request; and given a size, P, of the reserved space, determining that R−N<P;

while operating in the restricted write mode, using the reserved space in a process that frees space within the DMSR outside the reserved space; and exiting the restricted write mode in response to freeing space within the DMSR outside the reserved space.

2. The method of claim 1 wherein operating the DSS in the restricted write mode includes refraining from accepting new write request from users.

3. The method of claim 2, wherein operating the DSS in the restricted write mode further includes accepting a user request to delete a particular logical disk; and wherein using the reserved space in the process that frees space within the DMSR outside the reserved space includes:

deleting, from the DMSR, metadata that organizes the particular logical disk and adding pointers to the deleted metadata to a free list, the free list being at least partially stored within the reserved space.

4. The method of claim 2, wherein operating the DSS in the restricted write mode further includes accepting a user request to delete a particular snapshot of a logical disk; and wherein using the reserved space in the process that frees space within the DMSR outside the reserved space includes:

deleting, from the DMSR, metadata that organizes the particular snapshot of the logical disk and adding pointers to the deleted metadata to a free list, the free list being at least partially stored within the reserved space.

5. The method of claim 2 wherein operating the DSS in the restricted write mode further includes accepting read request from users.

6. The method of claim 2 wherein the method further comprises, while operating in the restricted write mode, flushing cached metadata from a metadata cache into the reserved space, the cached metadata representing write operations received by the DSS prior to entering the restricted write mode.

7. The method of claim 6 wherein reserving space within the DMSR includes reserving at least as much space as a capacity of the metadata cache.

8. The method of claim 1 wherein exiting the restricted write mode in response to freeing space within the DMSR outside the reserved space includes successfully allocating additional space for the DMSR.

9. The method of claim 1 wherein calculating the remaining amount, R, of space in the DMSR includes:

reading a cursor value of the DMSR, the cursor value indicating a lowest address of the DMSR to which metadata has not yet been written;

subtracting the cursor value from an allocated size of the DMSR to yield an intermediate result;

determining an amount of empty space within the DMSR below the cursor value by reading pointers from a list of freed blocks of metadata; and summing the intermediate result and the determined amount of empty space within the DMSR below the cursor value.

10. The method of claim 1, wherein entering the restricted write mode includes storing an indication of being in the restricted write mode within a specific portion of persistent storage; and wherein the method further comprises, in response to the DSS rebooting after a failure, reading the indication of being in the restricted write mode from the specific portion of persistent storage, and, in response, re-entering the restricted write mode.

11. A computer program product comprising a non-transitory computer-readable storage medium storing a set of instructions, which, when performed by processing circuitry of a data storage apparatus (DSA), causes the processing circuitry to manage operation of the DSA by:

reserving space within a dedicated metadata storage region (DMSR);

in response to determining that accommodating a storage request requires use of the reserved space, entering a restricted write mode, wherein determining that accommodating the storage request requires use of the reserved space includes:

calculating a remaining amount, R, of space in the DMSR;

determining an amount, N, of new metadata needed to accommodate the storage request; and given a size, P, of the reserved space, determining that R−N<P;

while operating in the restricted write mode, using the reserved space in a process that frees space within the DMSR outside the reserved space; and exiting the restricted write mode in response to freeing space within the DMSR outside the reserved space.

12. The computer program product of claim 11 wherein calculating the remaining amount, R, of space in the DMSR includes:

reading a cursor value of the DMSR, the cursor value indicating a lowest address of the DMSR to which metadata has not yet been written;

subtracting the cursor value from an allocated size of the DMSR to yield an intermediate result;

determining an amount of empty space within the DMSR below the cursor value by reading pointers from a list of freed blocks of metadata; and summing the intermediate result and the determined amount of empty space within the DMSR below the cursor value.

13. The computer program product of claim 11 wherein operating in the restricted write mode includes refraining from accepting new write request from users.

14. The computer program product of claim 13, wherein operating in the restricted write mode further includes accepting a user request to delete a particular logical disk; and wherein using the reserved space in the process that frees space within the DMSR outside the reserved space includes:

deleting, from the DMSR, metadata that organizes the particular logical disk and adding pointers to the deleted metadata to a free list, the free list being at least partially stored within the reserved space.

15. The computer program product of claim 13, wherein operating in the restricted write mode further includes accepting a user request to delete a particular snapshot of a logical disk; and wherein using the reserved space in the process that frees space within the DMSR outside the reserved space includes:

deleting, from the DMSR, metadata that organizes the particular snapshot of the logical disk and adding pointers to the deleted metadata to a free list, the free list being at least partially stored within the reserved space.

16. A data storage apparatus (DSA) comprising:

a plurality of non-transitory persistent storage drives; and processing circuitry coupled to memory configured to manage operation of the DSA by:
- reserving space within a dedicated metadata storage region (DMSR);
- in response to determining that accommodating a storage request requires use of the reserved space, entering a restricted write mode, wherein determining that accommodating the storage request requires use of the reserved space includes:
  - calculating a remaining amount, R, of space in the DMSR;
  - determining an amount, N, of new metadata needed to accommodate the storage request; and
  - given a size, P, of the reserved space, determining that R−N<P;
- while operating in the restricted write mode, using the reserved space in a process that frees space within the DMSR outside the reserved space; and
- exiting the restricted write mode in response to freeing space within the DMSR outside the reserved space.

17. The DSA of claim 16 wherein calculating the remaining amount, R, of space in the DMSR includes:

reading a cursor value of the DMSR, the cursor value indicating a lowest address of the DMSR to which metadata has not yet been written;

subtracting the cursor value from an allocated size of the DMSR to yield an intermediate result;

determining an amount of empty space within the DMSR below the cursor value by reading pointers from a list of freed blocks of metadata; and summing the intermediate result and the determined amount of empty space within the DMSR below the cursor value.

18. The DSA of claim 16 wherein operating in the restricted write mode includes refraining from accepting new write request from users.

19. The DSA of claim 18, wherein operating in the restricted write mode further includes accepting a user request to delete a particular logical disk; and wherein using the reserved space in the process that frees space within the DMSR outside the reserved space includes:

deleting, from the DMSR, metadata that organizes the particular logical disk and adding pointers to the deleted metadata to a free list, the free list being at least partially stored within the reserved space.

20. The DSA of claim 18, wherein operating in the restricted write mode further includes accepting a user request to delete a particular snapshot of a logical disk; and wherein using the reserved space in the process that frees space within the DMSR outside the reserved space includes:

deleting, from the DMSR, metadata that organizes the particular snapshot of the logical disk and adding pointers to the deleted metadata to a free list, the free list being at least partially stored within the reserved space.

* * * * *